United States Patent [19]

McCann et al.

[11] Patent Number: 4,784,444
[45] Date of Patent: Nov. 15, 1988

[54] FLUID-PRESSURE OPERATED ANTI-SKID BRAKING SYSTEMS FOR VEHICLES

[75] Inventors: Denis J. McCann, Powys; Allan Williams; Edwin R. Carswell, both of Gwent, all of Wales; William S. Broome, Worcestershire, England

[73] Assignee: Lucas Industries Public Limited Company, England

[21] Appl. No.: 19,433

[22] Filed: Feb. 26, 1987

[30] Foreign Application Priority Data

Mar. 5, 1986 [GB] United Kingdom ............... 8605383

[51] Int. Cl.⁴ ................ B60T 8/38; B60T 8/64; B60T 8/42
[52] U.S. Cl. .................... 303/118; 303/111; 303/115; 137/513.5
[58] Field of Search .............. 188/181 A; 303/57, 62, 303/64, 65, 102, 103, 106, 110, 111, 113, 115, 118, 119; 137/513.5

[56] References Cited

U.S. PATENT DOCUMENTS

| 2,372,456 | 3/1945 | Stewart | 137/513.5 |
| 3,190,284 | 6/1965 | Koepf | 137/513.5 |
| 3,653,588 | 4/1972 | Dreibelbis | 137/513.5 |
| 4,090,741 | 5/1978 | Rajput | 303/106 |
| 4,155,603 | 5/1979 | Harries | 303/110 |
| 4,230,377 | 10/1980 | Goebels | 303/118 |

FOREIGN PATENT DOCUMENTS

| 2503792 | 8/1976 | Fed. Rep. of Germany . |
| 2056232 | 8/1976 | Fed. Rep. of Germany ...... 303/113 |
| 2555998 | 6/1977 | Fed. Rep. of Germany . |
| 2934234A | 3/1981 | Fed. Rep. of Germany . |
| 2026113A | 1/1980 | United Kingdom . |

Primary Examiner—Andres Kashnikow
Assistant Examiner—Timothy Newholm
Attorney, Agent, or Firm—Laff, Whitesel, Conte & Saret

[57] ABSTRACT

Brakes (3, 4) on the wheels (7, 8) on a common axle are each controlled by a separate skid control unit (16, 17) each including a memory chamber (33, 34), and a single latch valve (21) common to both units closes at the first skid point to be sensed by a sensor (11, 12) on each wheel. The rate of re-application of the two brakes is controlled in response to signals from the individual sensors, but at rates of pressure increase determined by each respective memory chamber, and by flows of pressure controlled by restrictors (47).

12 Claims, 6 Drawing Sheets

FLUID-PRESSURE OPERATED ANTI-SKID BRAKING SYSTEMS FOR VEHICLES

This invention relates to improvements in fluid-pressure operated braking systems for vehicles of the kind in which operating fluid from a supply for actuating a wheel brake is supplied to the brake through a skid control unit interposed in a line between the supply and the brake, sensors provided to detect wheel skids and means responsive to a skid signal produced by any of the sensors are incorporated for operating valve means to relieve the pressure of the fluid supplied to the brake at a skid point, and the unit incorporates a memory chamber for storing a memory pressure dependant upon the brake pressure occurring at the skid point to provide a datum or knee point between first and second stages of brake re-application. Such systems will hereinafter be referred to as "of the kind set forth".

In known fluid pressure-operated braking systems of the kind set forth it is customary for a control unit to be provided for each front wheel of a pair of wheels on opposite sides of a vehicle, known generally in the field of Automobile Engineering as wheels on opposite ends of an axle, so that the behaviour of each front wheel, when the brake is applied, may be controlled independently of the other, according to prevailing road conditions, in order to ensure adequate steerability of the vehicle. In addition it is usual to arrange for a single control unit to control the behaviour of both wheels on the or each remaining axle of the vehicle simultaneously. Specifically a skid signal from one wheel on such an axle will actuate the single control unit to control, simultaneously, the operation of the brakes on both the wheels on that axle.

In the known constructions described above, the control unit incorporates a latch valve which closes at the skid point, thereafter to determine the second stage of brake re-application at which the brake pressure is increased but at a rate of pressure increase less than that at which the pressure increases during the first stage, which is dependent upon the memory pressure.

When the brakes on the wheels at opposite ends of an axle, other than the steerable wheels, are controlled by independent control units, each responsive to the behaviour of the respective wheel, a problem arises when the vehicle is travelling over a split $\mu$ surface with the wheels on opposite sides of the vehicle travelling over surfaces of different co-efficient of friction. Relieving and subsequently modulating the supply of fluid applied to the brake on the wheel travelling over the surface of lower $\mu$, and allowing the pressure applied to the brake on the wheel travelling over the surfaces of higher $\mu$ to increase at a rate determined by the brake applying means, may act to the detriment of stability of the vehicle According to one aspect of our invention, in a fluid-pressure operated braking system of the kind set forth, the brakes on the wheels at opposite ends of a common axle are each controlled by a separate skid control unit, and a single latch valve common to both units closes at the first skid point to be sensed by a sensor on either wheel, whereafter the rate of re-application of the two brakes is controlled in response to signals from the individual sensors, but at rates of pressure increase determined by the memory chamber of each respective unit, and by restricted flows of brake-applying fluid.

When both wheels are travelling over surfaces of identical low $\mu$s, both brakes will be released at the same time, and then re-applied in substantially similar sequences, namely in a first relatively rapid stage up to the knee point, determined by the memory pressure, followed by the second, slower, stage by the restricted flow to each brake as aforesaid.

When a split $\mu$ situation arises, both brakes will be released at the same time, but the brake on the wheel which is first to recover is first re-applied through the two stages, followed by re-application of the brake on the other wheel when that wheel has recovered.

In a preferred construction each skid control unit incorporates a solenoid-operated relay valve, and the latch valve is also operated by a solenoid, the wheel speed sensors producing signals which are fed into a control module which, in turn, is operative to supply an energising current to all three solenoids in response to a skid signal from one sensor, and thereafter to cause the solenoids of the relay valves to become de-energised to modulate control of the brakes individually, with the current maintained to the latch valve to hold it shut throughout that braking cycle.

The single control module may supply the energising current to the three solenoid-operated valves on two or more axles of a vehicle.

In the anti-skid system of the kind set forth, in which the skid control unit incorporates a latch valve which closes at the skid point thereafter to determine the stage of brake re-application but at a rate of pressure increase less than that at which the pressure increases during the first stage, which is dependant upon the memory pressure, means have to be incorporated for providing the second stage.

According to another aspect of our invention, means for producing the second stage of brake re-application in an anti-skid braking system of the kind set forth comprises a valve adapted to be installed in a by-pass passage between a source of control pressure and the downstream side of a latch valve which determines the skid point, and the valve comprises a seating, a valve member engageable with the seating to cut-off a substantial portion of flow through the valve in one direction, and a restricted orifice defined between the valve member and the seating to permit a restricted flow through the valve when the valve member is in engagement with the seating.

Thus a restricted supply of control pressure is available through the orifice to apply the brake at a lower rate of pressure increase than that permitted during the first stage.

Two such valves are particularly suitable for utilisation in a system in which a single latch valve is common to two skid control units for controlling the separate operation of the brakes on wheels at opposite ends of a common axle, so that the second stage of brake re-application is entirely independent from the common latch valve.

Preferably the restricted orifice in the valve comprises a notch in the seating with which the valve member is engageable.

In one construction the valve seating is of frusto-conical outline, and the valve member comprises a spherical ball. In such a construction movement of the ball away from the seating is limited by means of at least one radial finger.

One embodiment of our invention is illustrated in the accompanying drawings in which.

Figure 1:
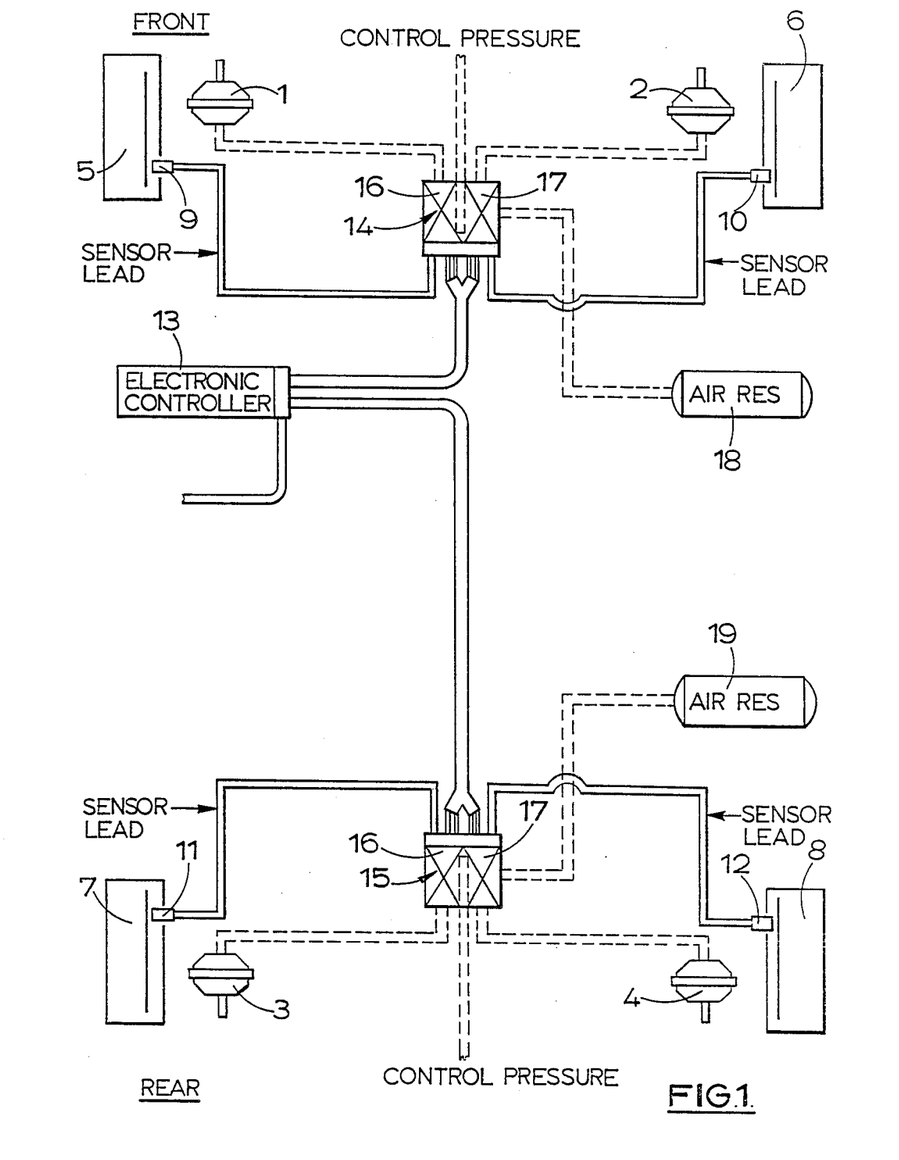
FIG. 1 is a layout of a two-axle vehicle provided with a relay-operated anti-skid pneumatic braking system.

In the anti-skid pneumatic braking system illustrated in the drawings brakes 1, 2, 3, 4 are provided on each of two front wheels 5 ,6 on a first axle of a vehicle, and on two rear wheels 7, 8 on a second axle of the vehicle, respectively. Each wheel is provided with a respective speed sensor 9, 10, 11 and 12, and the output signals from the sensors are fed into an electronic control module 13 which differentiates the signals and emits energising currents for operating front and rear skid control units 14 and 15.

Each skid control unit 14, 15 controls the supply of operating pneumatic pressure under the control of a treadle valve 29 to a relay valve 16, 17 for each respective wheel, and each relay valve 16, 17 in turn, controls the supply of air under pressure from a reservoir 1, 19 to the brakes 1 and 2, and 3 and 4.

Since the arrangements provided on both axles are similar, only that of the rear axle will be described.

Figure 2:
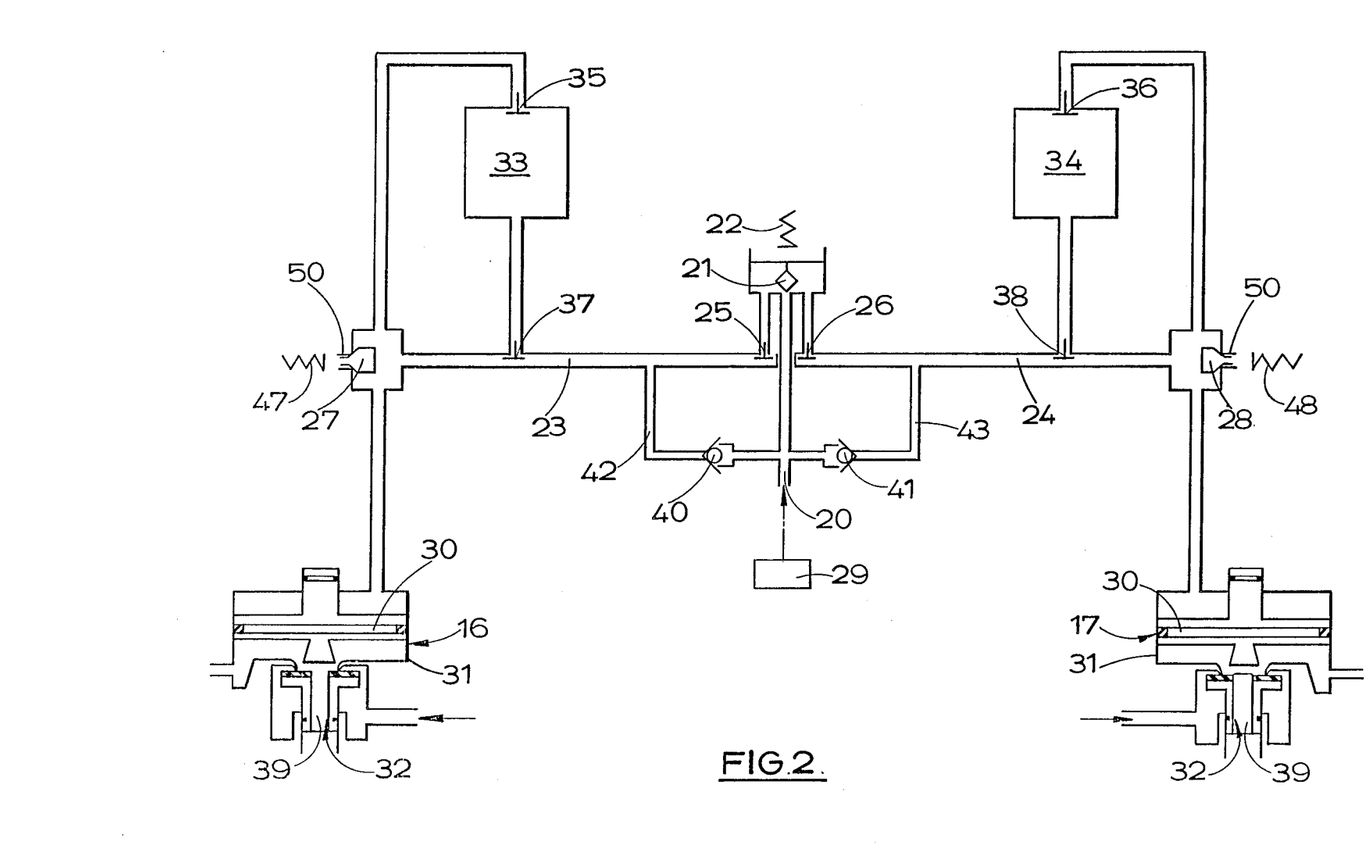
FIG. 2 is a schematic layout in more detail of the system arrangement for one of the two axles.

FIG. 2 shows, schematically, the construction of the skid control unit 15 for the brakes 3, 4 on the rear axle.

As illustrated a control pressure from the treadle valve 29 is supplied to an inlet passage 20 and through a normally open latch valve 21, operated by a solenoid 22, to the two relay valves 16 and 17 through passages 23 and 24 respectively. A one-way valve 25, 26 respectively, and a solenoid-operated cut-off valve 27, 28 respectively, each incorporating a normally closed exhaust port, are located in each passage 23 and 24 between the latch valve 21 and the respective relay valve 16, 17.

Each relay valve 16, 17 is of known construction incorporating a piston 30 working in a bore 31 and operable, in response to the control pressure, to control a main valve 32 between the common reservoir 19, the respective brake 3, 4, and a central exhaust passage 39.

A memory chamber 33, 34 is disposed between each solenoid valve 27, 28 and a connection in the pasasge 23, 24 between the one-way valve 25, 26 and the solenoid valve 27, 28, and one-way valves 35, 36 and 37, 38 are provided between the solenoid-operated valves 27, 28 and the chambers 33, 34, and between the memory chambers 33, 34 and the passages 23, 24.

Finally a one-way valve 40, 41 is provided in a passage 42, 43 leading from the inlet passage 20 to each respective passage 23, 24 on the downstream side of the latch valve 21, between the two one-way valves 25, 37 and 26, 38 respectively.

Figure 8:
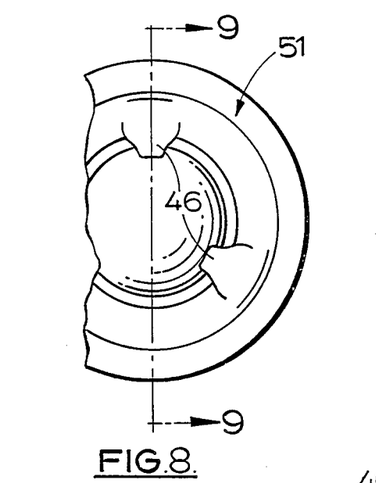
FIG. 8 is an end elevation of a one-way valve incorporated in the system and the control unit.
Figure 9:
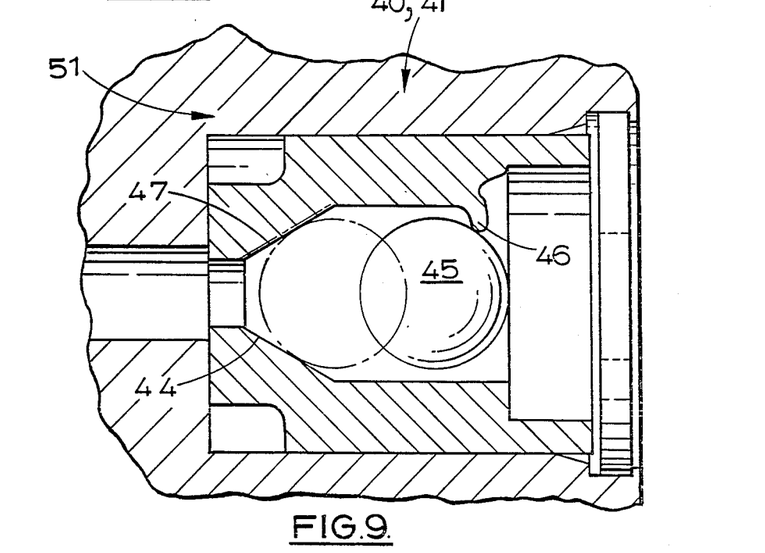
FIG. 9 is a section on the line 9—9 of FIG. 8

Each one-way valve 40,41 is illustrated on an enlarged scale in FIGS. 8 and 9 of the drawings. As illustrated each valve comprises a seating 44 of frusto-conical outline, and a valve member 45 in the form of a ball for engagement with seating 44. The movement of the ball 45 away from the seating is limited by three angularly spaced inwardly directed radial fingers 46 and, when the ball 45 is in engagement with the seating 44, a limited flow past the ball is permitted through a notch 47 in the seating 44.

As shown in FIGS. 4 to 7, all the valves 21, 40, 41, 35, 37, 36, 38, 27, 28, 16 and 17 and other components (33, 34) on each axle are housed and defined within a common housing 51.

The solenoid 22 of the latch valve and solenoids 47, and 48 of the valve 27 and 28 are adapted to be energised by a current from the control module 13. When such a current is emitted, the solenoid 22 will be energised before, or simultaneously with, the solenoids 47, 48.

In a normal inoperative position shown in FIG. 2 of the drawings, three solenoids 22, 47, and 48 are de-energised so that the latch valve 21 and the valves 47 and 48 are in the open position. Both relay valves 16, 17 are closed to isolate the brakes 3 and 4 from the reservoir 19.

Upon operation of the treadle valve 29 the control pressure is supplied to the inlet passage 20, and through the open latch valve 21, since the one way valves 40, 41 are closed by that pressure. The control pressure flows through the one-way valves 25 and 26, the passages 23 and 24, and the open valves 27 and 28 to act on the pistons 30 of the relay valves 16, 17. In addition the control pressure enters both memory chambers 33 and 34 through the respective one-way valves 35. The whole system is therefore subjected throughout to an equal control pressure.

The pressure acting on the pistons 30 causes both relay valves 16, 17 to operate in a known manner to supply air under pressure from the reservoir 19 to the actuators of the brakes in order to apply both brakes 3, 4 simultaneously. The pressure rises with time as shown in the portion A, B of the graph of FIG. 3.

Upon release of the treadle at the end of the braking cycle, air from the brakes 3, 4 is released to atmosphere through the exhaust passages 39, and the control pressure is released through the one-way valves 40 and 41 and an exhaust port on the treadle valve.

When the brakes 3, 4 are applied as described above and both wheels of the vehicle pass onto a surface of a low co-efficient of friction ($\mu$) which is sufficiently low for both sensors 11, 12 to emit skid signals substantially simultaneously, an equivalent energising current is emitted by the control module 13 to energise the three solenoids 22, 47 and 48 and thereby close the latch valve 21, and both valves 27 and 28.

Closure of the latch valve 21 isolates the direct flow of control pressure from the inlet passage 20 to the passages 23, and 24, but a restricted flow into the passages 23 and 24 still takes place through the notches 47 in the seatings 44 of the one-way valve 40, 41.

Closure of the valves 27, 28 isolates the passages 23 and 24 from the relay valves 16 and 17, which close by the exhaustion to atmosphere through the exhaust port 50 of the control pressures acting on the pistons 30. The pressure then drops from point B as shown in FIG. 3.

Due to the presence of the one-way valve 35, 36, a memory pressure is trapped in each memory chamber, and that pressure is equal to the valve of the control pressure applied to the pistons 30 when the skid signals were emitted by the sensors 11, 12 at the skid point.

Figure 3:
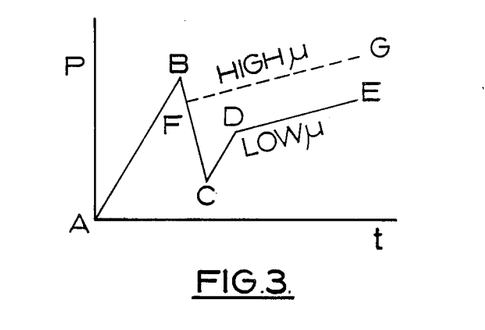
FIG. 3 is a performance graph.
Figure 4:
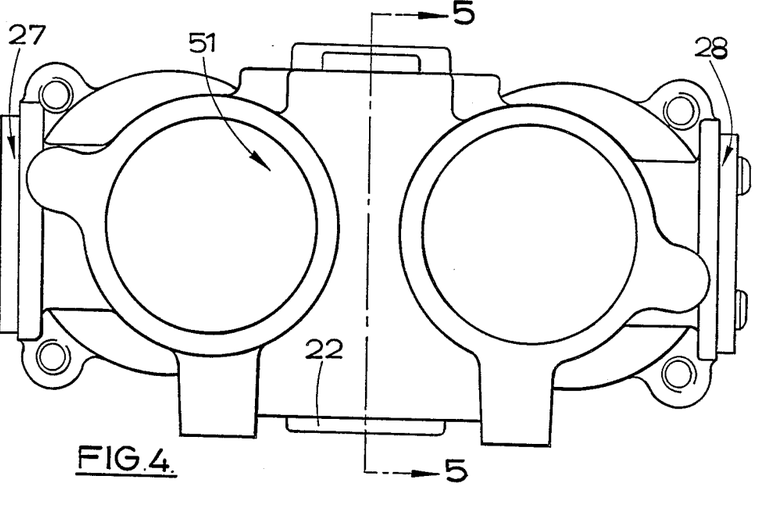
FIG. 4 is a end view of one practical form of control unit with all the valves and other components incorporated within a common housing.
Figure 5:
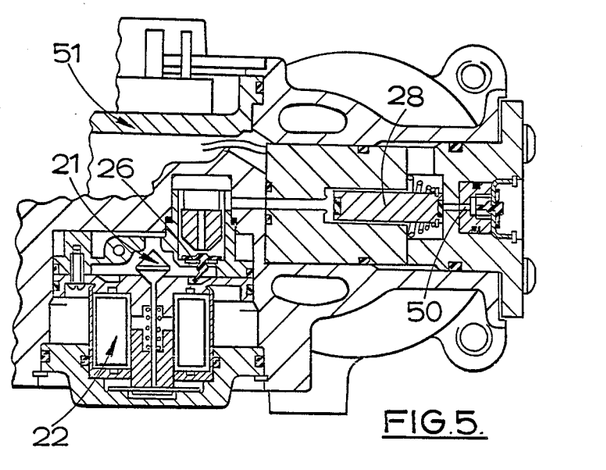
FIG. 5 is a section on the line 5—5 of FIG. 4.
Figure 6:
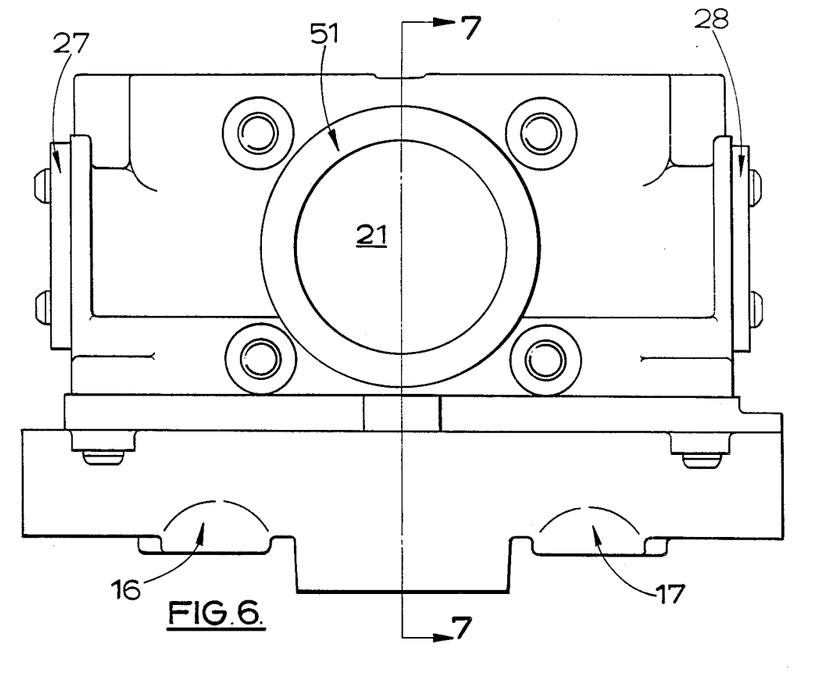
FIG. 6 is a plan of the unit.
Figure 7:
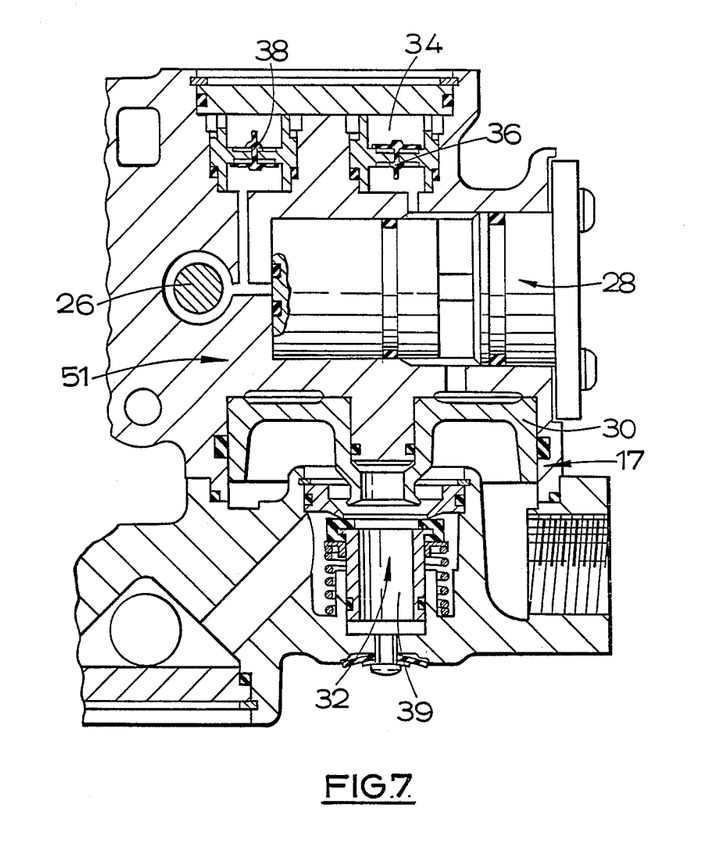
FIG. 7 is a section on the line 7—7 of FIG. 6.

When each wheel recovers and the skid signals are cancelled, say when the brake pressure has reduced to point C in FIG. 3, indicative that the quality of the road surface has improved sufficiently for the brakes 7, 8 to be re-applied, the control module 13 cuts-off the energising current to the two solenoids 47, 48 so that these two valves open again, but the solenoid 22 remains energised to hold the latch valve 21 in its closed position.

Opening the valves 27, 28 enables the pressures trapped in the memory chambers 33, 34 to be released through the one-way valves 37, 38 to act on the pistons 30 and act as application pressures to cause the relay valves 16, 17 to operate again to re-apply the brakes 3, 4 as described above.

Since the volumes of the chambers 33, 34 have to fill the remainder of the passages and the spaces in the bores 31 above the pistons 30, known as the application chambers, such volumes will only be sufficient to raise the brake pressure rapidly in a first stage up to a knee or changeover point D, as shown in FIG. 3, which is lower than the said point B. Thereafter the brakes are re-applied, in a second stage, but at a rate of pressure increase slower than that of the first, by the flow to the relay valves 16, 17 of a restricted flow of fluid through the notches 47 in the seatings of the one-way valves 40, 41. This is depicted in the graph of FIG. 3 by the line D E.

Should a further skid condition occur during the application of the brakes in a common cycle, then the sequence of brake release, and brake re-application as described above, will be repeated.

When the brakes are applied as described above, and one wheel, say the wheel 7, passes onto a surface of low μ with the other wheel travelling over a surface of high μ, a so-called split μ situation arises.

The sensor 11 emits a skid signal, in response to which the control module 13 energises all three solenoids 22, 47, 48 as described above to close the latch valve 21, and the two valves 27, 28. The pressure applied to the brakes 3, 4 is then relieved as described above.

Since no skid signal had been emitted by the speed sensor 12, the control module de-energises the solenoid 48 so that the brake 4 can be re-applied substantially instantly, and substantially with no loss of pressure from the memory chamber 34. However any increase in pressure applied to the brake 4 is controlled by a control pressure which can increase only at a rate determined by flow through the notch 47 in the one-way valve 41, due to closure of the latch valve 21. Thus, such a rate of pressure increase is equivalent to that normally experienced in the second stage of brake re-application, as indicated in the graph of FIG. 3 by the portion shown in dotted lines from F to G. The point F will normally coincide substantially with the skid point B. However, if there is any delay before the solenoid 48 of the valve 28 becomes de-energised, then the point F may drop below B. Should this occur, the re-application of the brake 4 may be achieved with an initial pressure increase in a first stage at a rate indicated by the slope C D, determined by the necessity for the volume of air trapped in the memory chamber first to make up any volume lost from the passages 24 and the application chamber above the piston 30 of the relay valve 17.

Controlling application of the brake on a wheel not subjected to a skid condition by means of a control pressure which can increase substantially at the rate of the second stage does not act detrimentally to the stability of the vehicle as might occur if no control is exercised over increase in pressure to the brake on that wheel.

In practice the control module 13 will take into account the behaviour of all the wheels, and a latch valve 21 on each axle, when closed during a skid cycle, will remain closed until the control module 13 has demanded, from information from all four speed sensors 9, 10 11 and 12, that the vehicle has moved onto a sufficiently good surface for the anti-lock system to be de-activated, and for the latch valves 21 to re-open.

Naturally the release of the brakes at the end of a braking cycle will de-activate the anti-lock system.

The one-way valves 25, 26 are provided to ensure that the two brake circuits on each axle are separate from each other, and there can be no mixing of the air on the two circuits, particularly after the latch valve 21 has closed.

We claim:

1. A fluid-pressure operated braking system for vehicles comprising first and second wheels provided at each end of a common axle, first and second wheel brakes for said first and second wheels respectively, a supply for providing brake-applying operating fluid to each wheel brake, an operating fluid supply line between said supply and each said brake, respective first and second separate independently operable skid control units interposed respectively in said line between said supply and said first and second brakes, sensors provided to detect the skid point of wheel skids and to provide a skid signal when a skid point is detected, means responsive to a skid signal produced by any of said sensors, valve means provided to relieve independently the pressure of the fluid supplied to said first and second brakes at a skid point, each said skid control unit comprising a part of a control fluid circuit and each incorporating a memory chamber for storing a memory pressure dependent upon the brake pressure occurring at said skid point to provide a datum or knee point between first and second stages of brake re-application, said valve means being controlled by said means responsive to a skid signal, wherein said first and second brakes on said respective first and second wheels are each controlled by one of said separate respective independently operable skid control units, and a single latch valve is provided common to both units, said latch valve closing at the first skid point to be sensed by one of said sensors on either wheel, whereafter said rate of re-application of each of said first and said second brakes is controlled in response to signals from the individual sensors at a respective initial rate and thereafter at a subsequent rate, said initial rate of brake pressure increase of said first brake being determined by said memory chamber of said first skid control unit and said initial rate of brake pressure increase of said second brake being determined by said memory chamber of said second skid control unit, said subsequent rate of brake re-application of said first and said second brake being controlled by a common restricted flow of said brake-applying fluid.

2. A system according to claim 1 wherein means to control the operation of said first and second skid control units is provided such that when both wheels of said axle are travelling over surfaces of the same co-efficient of friction and a said skid point is sensed said valve means releases the pressure of fluid supplied to both brakes and said skid control units then re-apply said brakes together in said first stage of brake re-application at a relatively rapid rate of brake re-application up to said knee point and then further re-apply said brakes in said second stage of brake re-application at a relatively slower rate determined by a separate restricted flow of said brake-applying fluid to each brake.

3. A system according to claim 2 wherein when said first wheel is travelling over a surface of different coefficient of friction than that of the surface over which said second wheel is travelling and a said skid point is detected from any wheel said control means operates said valve means to release both said first and second brakes at the same time, and wherein when both wheels are skidding the brake on the wheel which recovers first is first re-applied by its respective skid control unit through said two stages and said brake on the other wheel is independently re-applied by the other skid control unit through said two stages when that wheel has recovered.

4. A system according to claim 3 wherein when a skid point is detected at only said first wheel said control means acts such that said valve means releases both said first brake and said second brake simultaneously and said brake on said second wheel is immediately re-applied by said second skid control unit in said first stage of brake re-application with said brake pressure of said second brake being substantially equal to that which it was before said first and second brakes were released due to the pressure in said second memory chamber being substantially equal to that which it was immediately before said brakes were released, said brake on said second wheel thereafter being re-applied in said second stage of brake application, and said brake on said first wheel being re-applied by said first skid control unit through said two stages when that wheel has recovered.

5. A system according to claim 4 wherein when the conditions of the surfaces over which the wheels are travelling are such that said second brake is being applied in said, relatively slower, second stage of brake re-application by said second skid control unit at the same time that said first wheel recovers, said first brake is initially re-applied by said memory chamber of said first skid control unit in said, relatively rapid, first stage and thereafter said first brake is re-applied by said first skid control unit at the same, relatively slower, said second stage as said second brake, the supply of brake-applying fluid to said first and second skid control units being controlled by said single latch valve which is in turn controlled by said control means.

6. A system according to claim 1 wherein each skid control unit incorporates a solenoid-operated cut-off valve, and said latch valve is a solenoid-operated valve, said sensors producing signals which are fed into a control module which, in turn, is operative to supply an energising current to solenoids of all three solenoid-operated valves in response to a skid signal produced by any said sensor, and thereafter to cause said solenoids of said relay valves to become de-energised to modulate control of said brakes individually, with said energising current maintained to said latch valve to hold it shut throughout that braking cycle.

7. A system according to claim 1 wherein during said first stage of brake re-application said brake pressure of said first and second brakes is increased at respective rates dependant on said memory pressure of said first and second memory chambers respectively, and during said second stage of brake re-application said brake pressure of both said brakes is increased at a common slower rate than that at which it is increased during each brake's respective first stage of brake re-application, and means is provided in each said skid control unit for producing said second stage of brake re-application, said means comprising a restricted flow valve adapted to be installed in respective and independent by-pass passages between a source of control pressure and the downstream side of said latch valve which determines said skid point, each of said restricted flow valves comprising a seating, a valve member engageable with said seating to cut-off a substantial portion of flow through said valve in one direction, and a restricted orifice defined between said valve member and said seating to permit a restricted flow through said valve when said valve member is in engagement with said seating.

8. A system according to claim 7 wherein said brake-applying fluid flows from said source of control pressure through said restricted flow valves in said by-pass passages to said skid control units during said second stage of brake re-application and completely bypasses said single latch valve.

9. A system according to claim 7 wherein said restricted flow valves have a relatively small flow cross-section to control the flow of said brake-applying fluid in said by-pass passages in a first direction of flow which applies said brakes so as only to allow a restricted flow of brake-applying fluid to said first and second brakes during said second stage of brake re-application, and said restricted flow valves have a relatively large flow cross-section to control the flow of brake-applying fluid in said by-pass passages in a direction of flow opposite to said first direction of flow so as to allow a substantially larger flow of brake-applying fluid in the opposite direction of flow to said first direction of flow when the brake-applying pressure in the respective brakes is relieved by said source of control pressure during normal braking when a skid point has not been detected.

10. A fluid-pressure operated braking system for vehicles comprising first and second wheel brakes at opposite ends of a common axle, a supply for providing brake-applying operating fluid to said first and second wheel brakes, first and second fluid supply lines leading from said supply to said first and second brakes respectively, first and second skid control units interposed respectively in said first and second lines between said supply and said first and second brakes, sensors provided to detect wheel skids and to provide skid signals in response to wheel skids, first and second respective valve means provided to relieve the pressure of said fluid supplied to said first and second brakes at a skid point, means responsive to a said skid signal provided to control said first and second valve means, each said skid control unit comprising a part of a control fluid circuit and incorporating a memory chamber for storing a memory pressure dependant upon the brake pressure occurring at said skid point to provide a datum or knee point between first and second stages of brake re-application, wherein during said first stage of brake re-application said brake pressure is increased at a rate dependant on said memory pressure and during said second stage of brake re-application said brake pressure is increased at a slower rate than that at which it is increased during said first stage, and wherein each skid control unit incorporates means for producing the second stage of brake re-application which means comprising a restricted flow valve adapted to be installed in a by-pass passage for control fluid and located between a source of control fluid pressure and the downstream side of a latch valve which determines said skid point, said flow valve comprising a seating, a valve member, and a restricted orifice defined between said seating and said valve member, said valve member having a first position when said control fluid flows in one direction in said by-pass passage towards said skid control unit to apply said brake, in which said first position said valve member engages said seating to define said restricted orifice and permit a restricted flow of control fluid through said restricted orifice, and said valve member having a second position when said control fluid flows in the opposite direction in said by-pass passage to relieve the pressure in said skid control unit during normal braking when no skid point has been detected, in which said second position said valve member is spaced from said seating to define a larger orifice than said restricted orifice, a greater flow rate in said opposite direction being possible through said flow valve when said valve member is in said second position than is possible in said one direction when said valve member is in said first position, and wherein said latch valve of said first skid control unit and said latch valve of said second skid control comprise a single, common, latch valve, the rate of said second stage of brake re-application being independent from said single, common, latch valve since said brake-applying fluid flows through said by-pass passages of said first and second skid control units to completely by-pass said single, common, latch valve during said second stage of brake re-application.

11. A system according to claim 10 wherein control means is provided, said control means controlling the operation of said first and second skid control units such that re-application of said brake on each wheel is independent from re-application of said brake on the other wheel or wheels, each brake being independently re-applied in said first stage of brake re-application by said memory pressure in said memory chamber of its respective skid control unit, and thereafter being re-applied in said second stage of brake re-application by flow of brake-applying fluid through said by-pass passage of its respective skid control unit and past said flow valve of its respective skid control unit.

12. A system according to claim 10 wherein said restricted orifice in said restricted flow valve comprises a notch in said seating with which said valve member is engageable, and means is incorporated for limiting movement of said valve member away from said seating.

* * * * *